Patented Feb. 2, 1926.

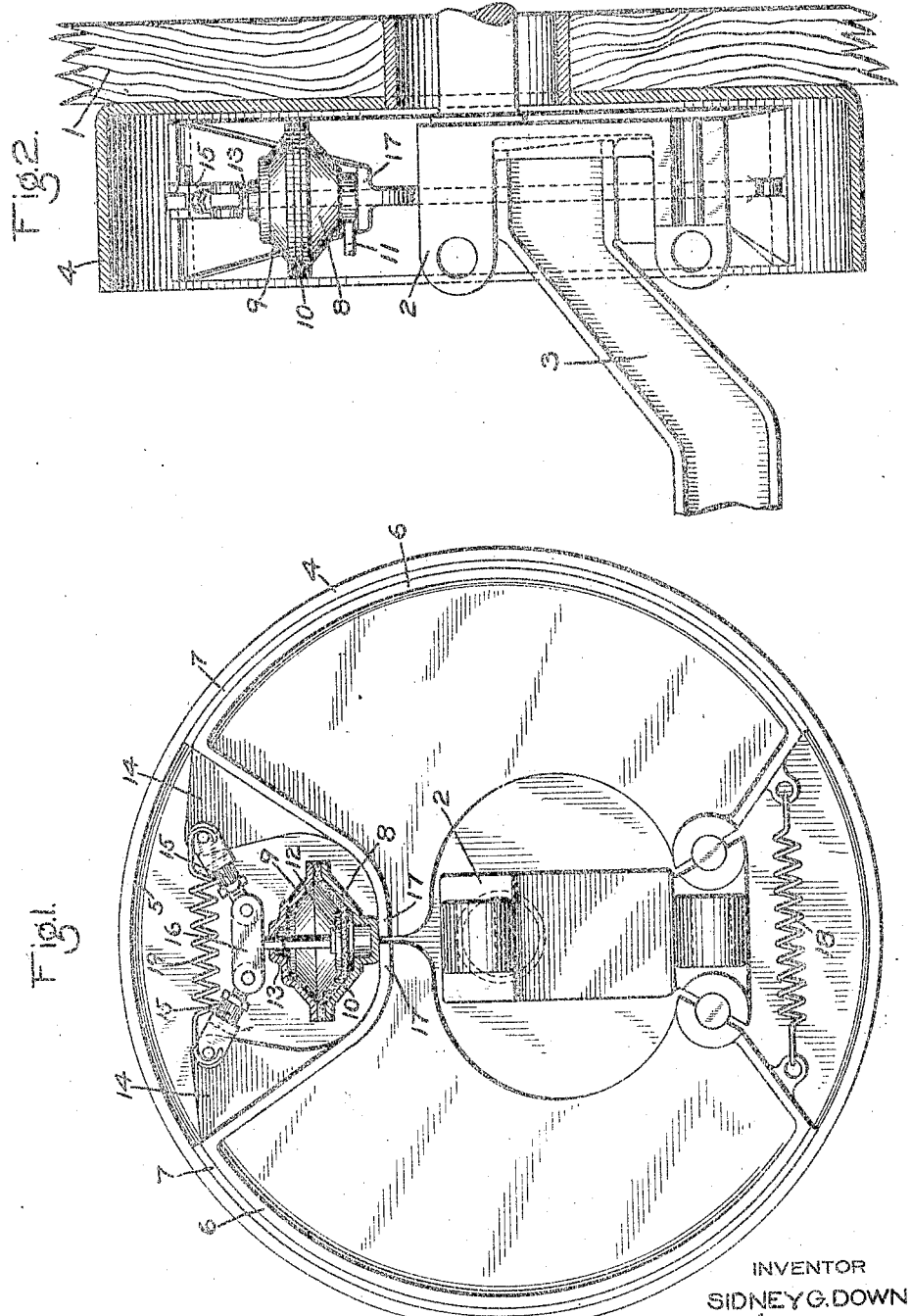

1,571,246

UNITED STATES PATENT OFFICE.

SIDNEY G. DOWN, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE.

Application filed March 11, 1924. Serial No. 698,509.

*To all whom it may concern:*

Be it known that I, SIDNEY G. DOWN, a citizen of the United States, residing at Pittsburgh, in the county of Allegheny and State of Pennsylvania, have invented new and useful Improvements in Automotive Brakes, of which the following is a specification.

This invention relates to vehicle brakes, and more particularly to a fluid pressure operated front wheel brake.

The principal object of my invention is to provide an improved fluid pressure front wheel vehicle brake.

In the accompanying drawing; Fig. 1 is a side elevation of a front wheel brake mechanism embodying my invention; and Fig. 2 a central sectional view of the construction shown in Fig. 1.

As shown in the drawing, the reference numeral 1 indicates a front wheel of a motor vehicle, which is carried by the usual steering knuckle 2, said knuckle being mounted on the usual front axle 3.

Secured to the wheel 1 is a brake drum 4 having an internal friction face 5 and mounted in said drum are brake heads 6, each provided with a brake shoe 7 adapted to engage the friction face 5 of the drum 4.

Mounted intermediate the free ends of the brake heads 6 is a brake chamber comprising a flanged casing section 8, a flanged cover section 9, and a flexible diaphragm 10, which is secured between the flanges of the casing section and the cover section. A pipe 11 is connected to the chamber at one side of the diaphragm 10 and fluid under pressure is supplied to and released from said diaphragm through said pipe.

A pressure plate 12 engages the opposite side of diaphragm 10 and secured to said plate is a push rod 13. A lug 14 is provided at each of the free ends of the brake heads 6 and pivotally connected to each lug is a link 15. The opposite ends of said links are pivotally connected to a crosshead 16, secured to the end of the push rod 13.

The inner portions of the free ends of the brake heads 6 are extended toward each other to form supports 17 for the brake chamber casing 8, so that a separate supporting means for the brake chamber is dispensed with.

When fluid under pressure is supplied through pipe 11 to the flexible diaphragm 10, said diaphragm is operated to cause an outer movement of the push rod 13. The links 15 are then actuated by said push rod to spread the ends of the brake heads 6 and thus cause the engagement of the brake shoes 7 with the friction face 5 of the brake drum 4.

Upon releasing fluid under pressure from the diaphragm 10, the coil springs 18 and 19 will act to effect the release movement of the brake heads 6 and the connected parts so as to release the brakes.

By means of the above described construction, the fluid pressure brake chamber is entirely disposed within the brake drum and the brake heads are utilized as the supporting means for the brake chamber.

Having now described my invention, what I claim as new and desire to secure by Letters Patent, is:—

1. In a vehicle brake, the combination with a brake drum and brake heads mounted in said drum and having the free ends of the brake heads extended, of a brake chamber mounted on the extended ends of said brake heads, a movable abutment in said chamber, and a push rod operable by said abutment and operatively connected to the free ends of said brake heads.

2. In a vehicle brake, the combination with a brake drum and brake heads mounted in said drum, of a brake chamber, a movable abutment in said chamber, and a push rod operable by said abutment and operatively connected to the free ends of said brake heads, the free ends of the brake heads being provided with inwardly extending portions forming a support for said brake chamber.

In testimony whereof I have hereunto set my hand.

SIDNEY G. DOWN.